3,486,907
METHOD OF FREEZE DRYING COFFEE EXTRACTS
Eddy R. Hair, Colerain Township, Hamilton County, and David A. Strang, Springfield Township, Hamilton County, Ohio, assignors to The Procter & Gamble Company, Cincinnati, Ohio, a corporation of Ohio
Filed Dec. 15, 1966, Ser. No. 601,953
Int. Cl. A23f 1/08
U.S. Cl. 99—71                                   6 Claims

ABSTRACT OF THE DISCLOSURE

The drying time for freeze drying of aqueous coffee extracts is reduced by allowing the temperature of the dried portion of the extract to rise to from about 120° F. to about 200° F. As long as the critical time-temperature relationships shown on the accompanying graph are maintained, no significant flavor loss is encountered.

Background of the invention

Figure 1:
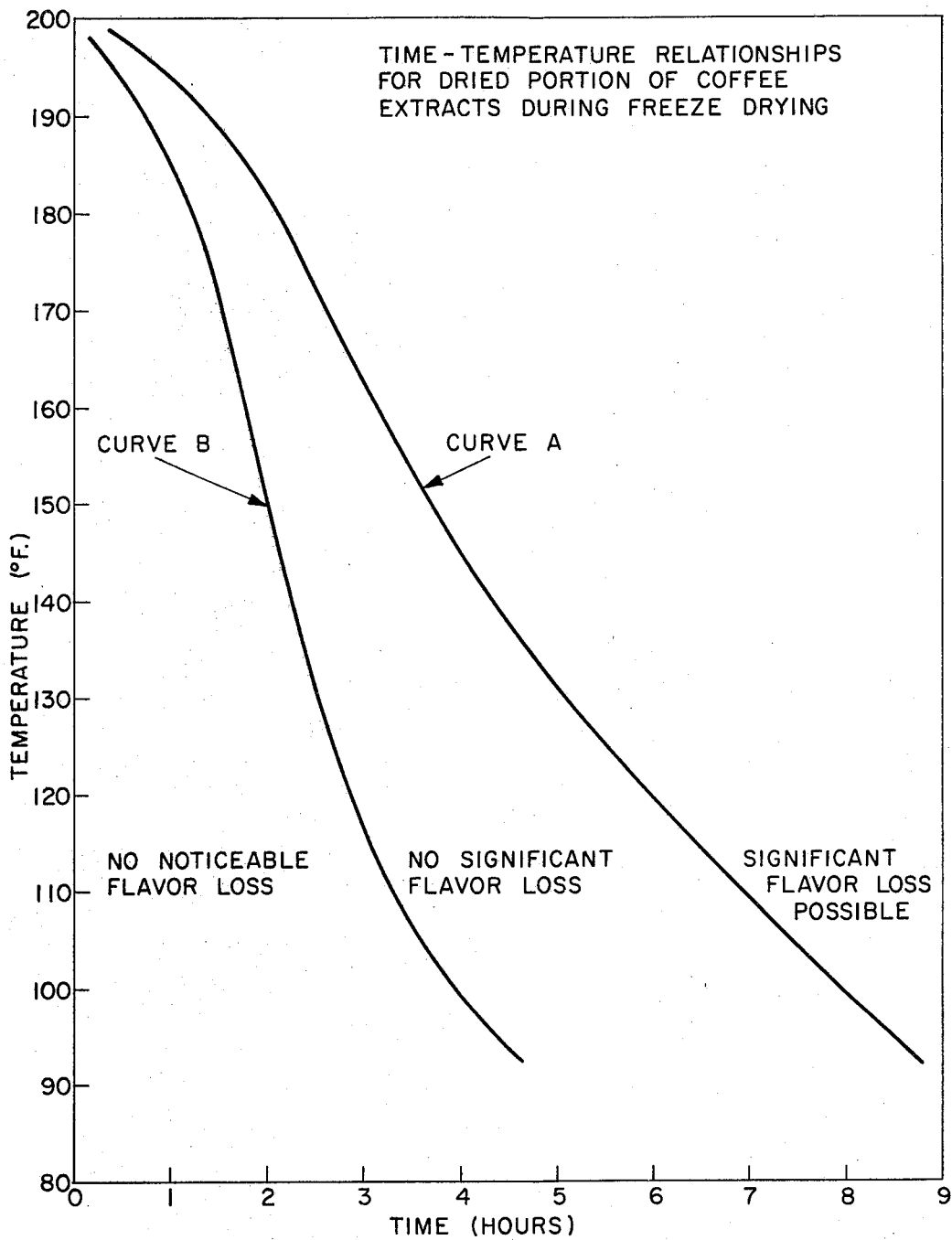

This invention relates to the preparation of instant coffee. Specifically, it deals with a novel method for the rapid freeze drying of aqueous coffee extracts.

Economic considerations have prevented the widespread marketing of food products preserved by freeze drying; however, the freeze drying process is not new to the food industry. The freeze drying process involves freezing of the material to be preserved, placing the frozen material in a sealed chamber under vacuum, and then transferring heat to the frozen material to remove water by sublimation. In this manner the product is dried without being subjected to the relatively high temperatures involved in other forms of drying, such as spray drying, which often cause flavor loss and off-flavor development.

The freeze drying process has been applied successfully (at least on an experimental level) to the preservation of many food products, such as fruit juices, ice cream, meats, fruits and vegetables. The process also has been found applicable to the drying of frozen aqueous coffee extracts. Typical examples of descriptions of processes for freeze drying of coffee extracts can be found in articles by Muller, "Freeze Processing of Coffee," World Coffee and Tea, May 1966, pp. 54–59; and Heyman, "Freeze-Dried Coffee," World Coffee and Tea, September 1964, pp. 40–41; and in Canadian Patent 723,129 to Clinton et al., issued Dec. 7, 1965.

The most serious drawback in the freeze drying of aqueous coffee extracts is the extremely slow rate of drying which has been required. While such a slow rate is not a serious detriment in the production of low volume, high price items (pharmaceuticals for example), it is a serious obstacle in the preparation of high volume, relatively less expensive products such as instant coffee.

First, serious expense and inconvenience is encountered in freeze drying due to the long drying cycles which are commonly of the order of 8 to 16 hours. Second, to produce freeze-dried coffee on a commercial scale, a large number of drying units is required because of the long drying cycles. The drying units are quite large and require sizable amounts of building space.

The principal reason for the slow drying rate in freeze drying of aqueous coffee extracts appears to be the following. As a piece of frozen coffee extract is freeze dried, a shell of dried coffee builds up around the core of the undried frozen extract. The continued transfer of heat to the particle to sublime water from the core increases the temperature of the dried coffee. Heretofore, the average temperature of this dried coffee had been maintained at relatively low temperatures, such as at a maximum of about 110° F., to avoid loss of flavor and the development of off-flavors in the dried product. Maintaining of the dried portion of the coffee extract at or below this relatively low drying temperature necessitated a low rate of heat transfer to the core of frozen extract, thus producing the long drying times.

Summary of the invention and brief description of the drawing

It has now been discovered that the above described practice of maintaining relatively low temperature in the dried portion of the extract is not essential to the attainment of satisfactory flavor retention during the freeze drying process. The prior art workers were correct in assuming that the dried product cannot be maintained at relatively high temperatures for the entire drying cycle; however, they were incorrect in assuming that the temperature of the dried product had to be maintained at relatively low temperatures during the entire drying operation. It has been found that the temperature of the dried product can reach temperatures as high as about 200° F. for short periods of time during the drying cycle without seriously damaging the flavor of the coffee. It was this finding which led to the process disclosed herein.

It has been determined that flavor retention is not the sole function of the temperature of the dried portion of the coffee extract; it varies according to an inter-dependent time-temperature relationship. Accompanying FIGURE 1, curve A, is a graphical representation of this time-temperature relationship. Accompanying FIGURE 1, curve B, is a graphical representation of the preferred time-temperature relationship. Both curves are discussed more fully below. In the process of the present invention, frozen aqueous coffee extracts are freeze-dried using the graphical relationships shown in FIGURE 1 as guidelines.

More specifically, the present invention consists of a process for rapidly freeze drying a frozen aqueous coffee extract which comprises maintaining the frozen extract at a temperature of less than about −10° F. and at an absolute pressure of less than about 500 microns of mercury, transferring heat to the frozen extract at a rate sufficient to promote sublimation of the frozen water in the extract, and varying the rate of transferring heat whereby: (a) the maximum temperature of the dried portion of the extract exceeds about 120° F. during some portion of the freeze drying process; (b) the maximum temperature of the dried portion of the extract never exceeds about 200° F.; and (c) the length of time for which any part of the dried portion of the extract is held at and above any temperature below about 200° F. does not exceed the time shown in accompanying FIGURE 1, curve A.

Discussion of the invention and description of preferred embodiments

Freeze dried coffee prepared as described above has a brew-like coffee flavor which is substantially the same as freeze dried coffee of the prior art, but it is freeze dried in about 50% or less time than that required to freeze dry prior art freeze dried coffee. In a preferred embodiment of this invention the length of time for which any part of the dried portion of the extract is held at and above any temperature below about 200° F. does not exceed the time shown in FIGURE 1, curve B. In this preferred embodiment freeze dried coffee is produced which has a flavor that is substantially identical to freeze dried coffee of the prior art even though a time savings in the freeze drying step of as much as about 35% is achieved.

When the frozen aqueous extract is placed in the drying chamber and heat is applied to sublime water from the frozen extract, the temperature of the dried portion of the extract begins to rise. In the operation of the process disclosed herein, the temperature of the dried portion of the extract must exceed at least about 120° F. during some portion of the drying cycle, preferably from about one to about four and one-half hours, in order to achieve the rapid drying times characteristics of this invention. Preferably the temperature of the dried portion exceeds at least about 140° F., for at and above this temperature the maximum time savings in the freeze drying operation are achieved. At the other extreme, the temperature of the dried portion of the extract cannot exceed about 200° F. during any portion of the freeze drying operation; above this temperature, the coffee flavor materials deteriorate and off-flavors develop at a rapid rate. Preferably, the temperature of the dried portion of the extract does not exceed about 180° F.

For purposes of this invention, it is not material whether the highest temperature of the dried portion of the extract is reached early or late in the freeze drying cycle. The important factor is that the length of time for which any part of the dried portion of the extract is held at or above any temperature below about 200° F. does not exceed the time shown on FIGURE 1, curve A. For example, no part of the dried portion of the extract can be allowed to remain at or above about 172° F. for more than about two and one-half hours. Similarly, no part of the dried portion of the extract can be allowed to remain at or above about 145° F. for more than about four hours; not at or above about 125° F. for more than about five and one-half hours.

In a similar manner, referring to FIGURE 1, curve B, in the preferred operation of the invention disclosed herein, no part of the dried portion of the extract can be allowed to remain at or above about 170° F. for more than about one and one-half hours; nor at or above about 150° F. for more than about two hours; nor at or above about 130° F. for more than about two and one-half hours.

During drying, accurate measurement of the temperature profile in the dried portion of the extract is difficult, particularly when small pieces of frozen extract are being dried. However, in all but the most unusual drying operations, the surface temperature of the dried portion of the extract can be used as the critical temperature. If this temperature is monitored during the entire drying cycle and found to be within the critical time-temperature relationships discussed above, it can be assumed with confidence that the temperature of no other part of the dried portion is substantially greater than the surface temperature. This is inevitably true in the most common procedure wherein heat is applied continuously to the frozen extract during the drying cycle and the temperature of the dried portion rises during the entire cycle. The temperature of the surface of the dried portion of the extract can be conveniently and easily measured with reasonable accuracy (±10° F.) by placing a thermocouple at or slightly below the surface of a large particle of frozen extracts or among the small particles of frozen extract, as the case may be. Other methods of measuring and monitoring the surface temperatures of the particles during the freeze drying cycle will be apparent to those skilled in the art.

Once a specific time-temperature profile is chosen for operation within the scope of this invention, the freeze drying process can be controlled by the use of conventional process control equipment. Generally the heat in a freeze drying operation is supplied by radiant heaters located above the material to be dried or by other heating means as conventional conduction heating plates. The amount of heat transferred from these heating devices easily can be controlled by means of temperature responsive control elements activated by thermocouples or temperature responsive resistors located in the material to be dried. For additional precision in temperature control, a cooling means, such as a cooling coil, can be placed in proximity to or in contact with the material to be dried and also controlled by the temperature responsive control elements. Systems of these general types are well known in the art and can be supplied by manufacturers of freeze drying equipment.

To permit the sublimation process to proceed effectively, the pressure in the freeze drying chamber must be less than about 500 microns of mercury absolute. At higher pressures, portions of the frozen extract begin to melt, the sublimation process is hindered or prevented, and portions of the dried extract are redissolved. Preferably, the pressure in the freeze drying chamber is less than about 200 microns of mercury absolute because it is at these pressures that the sublimation process proceeds most rapidly.

The length of the drying cycle will vary substantially depending upon the pressure in the freeze drying chamber, the rate of transfer of heat to the frozen extract, and the amount, thickness and moisture content of the frozen extract. Under normal operating conditions, such as those generally described herein, drying times of from about two to about ten hours can be expected. The optimum time for discontinuing the drying operation easily can be determined by inserting in the vacuum system a condenser for condensing the water removed from the frozen extract. Since the amount of water in the frozen extract is known, measurement of the amount of water which is removed will disclose when the moisture content of the freeze dried product has reached the desired level, i.e., from about 1.5% to about 4% by weight moisture.

The aqueous coffee extract used in the preparation of the freeze dried product disclosed herein can be prepared by any convenient process. The most common process involves roasting a blend of green coffee beans and then grinding the roasted beans to from about 8 to about 20 mesh Tyler screen size. If desired, oil can be expelled from a portion of the roasted beans prior to grinding. The oil is chilled and saved for addition to the dried coffee powder prior to packaging.

The roast and ground coffee is then placed in a series of elongated columns known as an " extraction train." Frequently, a volatile flavor fraction is removed from at least a portion of the roast and ground coffee by steam or vacuum distillation. The volatile flavor fraction is condensed and saved for reincorporation at a later stage of processing.

After distillation the roast and ground coffee is extracted with hot water. The most common extraction method is by countercurrent contact of columns of progressively fresher coffee with water which has a continuously decreasing temperature. This is generally accomplished by admitting hot water to the most spent coffee column at about 340° F. to about 380° F., and allowing the water to decrease in temperature by natural heat losses as it contacts the columns of progressively fresher coffee. The last column contains previous unextracted roast and ground coffee, and the final extract emits from the last column at about 190° F. to about 220° F.

The extract then is readied for freeze drying in accord with the process of this invention. If a volatile flavor fraction has been removed by distillation, as mentioned above, it is preferably reincorporated into the extract at this time. In another preferred embodiment of the invention, the extract is concentrated either before or after the addition of the volatile flavor fraction; the higher concentration of coffee solubles helps to preserve the fugitive flavor materials contained in the extract and, particularly, in the distillate. Concentration can be by any of a number of well known methods such as flashing, freeze concentration and thin film evaporation.

The concentration of coffee solubles in the extract prior to freezing of the extract determines the density of the freeze dried product. Accordingly, the concentration of the extract prior to freezing can be adjusted to the level which will produce the particular bulk density desired in the final product. For example, if an extract containing about 20% by weight coffee solubles is frozen and freeze dried by the process disclosed herein, a freeze dried product having bulk density of about 0.22 gram per cubic centimeter will result. However, if the concentration of coffee solubles is increased to about 30% by weight, the final freeze dried product will have a bulk density of about 0.38 gram per cubic centimeter. In the preferred operation, the coffee solubles concentration in the aqueous extract prior to drying is from about 20% to about 35% by weight because such extracts produce final products which have bulk densities which appeal to most consumers.

At this stage of processing, the extract is frozen in preparation for freeze drying. While various continuous freezing techniques have been developed, such as spray-freezing and continuous belt freezing, the method most commonly employed is conventional batch freezing of the liquid extract in shallow metal trays. The extract is poured in the trays to a maximum depth of about one-half inch, and preferably about one-quarter inch. With depths in excess of one-half inch, the time required for freezing the extract will be unduly long. Then the trays are placed in a conventional freezing chamber which preferably has an atmospheric temperature of from about −5° F. to about −40° F. The freezing rate determines the ultimate color of the freeze dried product. When the temperatures are above about −5° F. the final breeze dried product has an acceptable dark brown color but the time required for freezing the extract is unduly long. If temperatures below about −40° F. are used, the rapid freezing rate produces a final freeze dried product with an excessively light color which is unappealing to most consumers.

If the extract is frozen in trays, it may be freeze dried in its slab form or the slab may be granulated to form smaller particles, preferably between about 2½ and about 12 mesh Tyler screen size. The granulation preferably is accomplished by the use of pre-chilled granulating equipment to prevent melting portions of the frozen extract. If the extract has been frozen in small particles or if granulated after freezing, the frozen particles of extract are placed in any convenient container, such as the trays which are used for freezing the extract. The slab or particles are then ready for the rapid, high temperature freeze drying step employing the time-temperature relationships which are characteristic of this invention.

The type of freeze drying equipment used in practicing this invention is not a limitation upon its scope. Any equipment capable of achieving sufficient vacuum can be used. A large number of suitable types of freeze drying equipment are available in the market; two typical examples of such equipment are illustrated in the accompanying examples, below.

If the frozen extract is granulated prior to freeze drying, the freeze dried particles may need no further size reduction prior to packaging. If the frozen extract was freeze dried in a slab form, the slab preferably is granulated to a maximum particle size of about one-quarter inch. The preferred size range for the freeze dried instant coffee particles is from about 10 mesh to about 80 mesh Tyler screen size. To the granulated freeze dried particles is added any coffee oil which was expelled from the roasted coffee beans as mentioned above. The product is then ready for packaging, preferably under an inert gas atmosphere which helps to preserve its flavor and aroma. Suitable inert atmospheres include nitrogen and carbon dioxide.

The following examples are given to demonstrate the rapid, high temperature freeze drying process of this invention in the drying of frozen aqueous coffee extracts. However, these examples are not intended to be limitations upon the scope of the invention. Unless stated to the contrary all ratios and percentages are on a weight basis.

Example I

A 600 pound batch of roast and ground coffee (through #8 mesh; 95% by weight on a #20 mesh Tyler screens) was used to prepare an aqueous coffee extract in a conventional pilot plant size countercurrent extraction train. The extraction system consisted of six stainless steel columns, each 6 feet high and 6 inches in diameter, connected in series for continuous countercurrent operation. Each column held approximately 26 pounds of the roast and ground coffee. The inlet temperature of the water was 365° F.; the extract cooled by natural heat losses as it passed through the system and was withdrawn at 210° F. The extract contained 25% by weight coffee solubles.

Twenty pounds of the extract obtained above were separated for freeze drying. The extract was poured into 8 inch by 12 inch aluminum trays to a depth of ¼ inch and the trays were suspended in a −35° F. Dry Ice-acetone bath for fifteen minutes to freeze the extract. The frozen slabs of extract were chopped by hand into small pieces (approximately ⅛ inch cubes) and the pieces were placed, at a loading factor of 0.75 pound per square foot, in the trays of a Repp Industries, Inc. "Sublimator 40" laboratory scale freeze dryer. Thermocouples were placed on the top and bottom of the layer of frozen extract pieces. The absolute pressure in the freeze drying chamber was reduced to 100 microns of mercury absolute. Heat was then transferred to the frozen particles via radiant heaters above the trays and conduction heaters below the shelf on which the trays were placed. The transfer of heat was controlled by the thermocouples so as to produce a maximum temperature in the dried portion of the frozen particles of 150° F. This temperature was maintained for one and one-half hours. The total drying time was two and one-half hours. The length of time for which the temperature of any part of the dried portion of the extract was held and at above any temperature below 150° F., did not exceed the time shown in accompanying FIGURE 1, curve B. The fiinal moisture content of the freeze dried product was 3.5% by weight.

The freeze dried particles were removed from the dryer and tested to determine the degree of change in flavor character, if any, which occurred during the freeze drying operation. Sufficient water was added to the freeze dried particles to prepare an aqueous coffee solution with a concentration of 25% by weight coffe solubles, the same concentration as the original extract from which the freeze dried particles were prepared. The flavor of the two coffee solutions was compared by an expert panel. The solution prepared from the freeze dried coffee was found to have an excellent brew-like coffee flavor which was substantially identical to the flavor of the original extract.

Example II

Using a 600 pound batch of the same coffee as in Example I, as well as the same extraction system and operating conditions, an aqueous extract containing 25% by weight coffee solubles was prepared. Twenty pounds of the extract were poured into 8 inch by 12 inch aluminum trays to a depth of ³⁄₁₆ inch. The trays then were suspended in a —30° F. Dry Ice-acetone bath for fifteen minutes to freeze the extract. After this time the slabs of extract were removed from the trays and hand-granulated to form small pieces (approximately ³⁄₁₆ inch cubes). The frozen particles were loaded in the aluminum trays described in Example I at a loading factor of 1.9 pounds per square foot and vibrated to pack and level the pieces. The trays then were placed on the shelves of the laboratory freeze dryer of Example I and thermocouples were placed on the top and bottom of the layer of frozen extract pieces. The pressure in the drying chamber was reduced to 100 microns of mercury absolute. Heat was transferred to the freeze dried particles using the radiant and conduction heaters described in Example I. During drying the maximum surface temperature of the freeze dried particles reached 150° F. and was maintained at that temperature for two and one-half hours. The length of time for which the temperature of any part of the dried portion of the extract was held at and above any temperature below 150° F., did not exceed the time shown in accompanying FIGURE 1, curve A. The total drying time was four hours; the final moisture content was 2.5% by weight.

The freeze dried particles were used to prepare an aqueous coffee solution containing 25% by weight coffee solubles the same as the original extract, and was compared with the original extract by an expert taste panel as in Example I. The solution prepared from the freeze-dried particles was found to have an excellent brew-like coffee flavor; further, no significant loss in flavor was incurred during the freeze drying operation.

When in the above example, the heat is transferred to the four different samples of frozen extract pieces listed in Table A at rates which produce: (a) the maximum temperatures in the dried portions of the extracts for the times indicated in Table A; (b) the total drying times indicated in Table A; and (c) temeprature profiles wherein the lengths of time for which the temperatures of any part of the dried portions of the extracts are held at and above any temperature below the indicated maximum temperatures, do not exceed the times shown in FIGURE 1, curve A; substantially similar results are obtained in that freeze-dried coffees are produced which, when mixed with water, produce coffee solutions with brew-like coffee flavor. Further, the flavors of these coffee solutions do not differ substantially from the flavors of the coffee extracts used to prepare the freeze-dried particles.

TABLE A

| Sample | Maximum Dried portion temperature, °F. | Time at maximum temperature, hours | Total drying time, hours |
| --- | --- | --- | --- |
| 1 | 175 | 1.5 | 3.25 |
| 2 | 160 | 2.0 | 3.75 |
| 3 | 145 | 3.0 | 4.0 |
| 4 | 130 | 3.0 | 5.5 |

Example III

A 600 pound batch of the roast and ground coffee described in Example I was used to prepare an aqueous coffee extract using the same equipment as in Example I. Prior to extraction a volatile flavor fraction was removed from the roast and ground coffee by passing 10 p.s.i.g. steam through the coffee for 20 minutes. The volatiles removed from the column were passed through a 35° F. condenser and into a 110° F. cold trap. The weight of the distillate was equal to 5% by weight of the roast and ground coffee which was steamed. During extraction the water inlet temperature was 350° F.; the extract cooled by natural heat losses as it passed through the system and was withdrawn at 205° F. The extract contained 23.5% by weight coffee solubles.

As the extract emitted from the extraction system it was split into two portions. The first portion, which contained 25% by weight of the total coffee solubles extracted, was sent to a storage tank where it was mixed with the distillate obtained as described above. The second portion of the extract, which contained 75% by weight of the total coffee solubles extracted, was sent immediately to a conventional spray drier, 35 feet high by 14 feet in diameter. The second portion extract was atomized at 450 p.s.i.g. into a cocurrent stream of hot air. The air inlet temperature was 550° F. and the outlet temperature 230° F. A sufficient amount of these spray dried solids was added to the mixture of the first portion extract plus distillate to bring the final concentration to 25% by weight coffee solubles.

The extract then was poured in 2 foot by 5 foot stainless steel trays to a depth of ¼ inch. The trays were transferred to a freezing room which was maintained at —10° F. When the extract was frozen the temperature of the room was reduced to —30° F. to make the frozen extract more brittle. The slabs of extract were granulated in a pre-chilled hammermill to yield approximately ¼ inch pieces. These pieces were loaded at a factor of 1.4 pounds per square foot on the trays of a Food Machinery Corp. "Pilot" 150 square foot freeze drier. The pressure in the freeze drier was reduced to 150 microns of mercury absolute and heat was transferred to the particles via radiant heaters above the trays and conduction heaters below the shelves on which the trays rested. The maximum temperature reached by the dried portion of the extract was 151° F., which temperature was maintained for one hour and 45 minutes. During the drying cycle, the length of time at which any part of the dried portion of the frozen extract was held at any temperature below 151° F. did not exceed the time shown on FIGURE 1, curve B. The total drying time was five and one-half hours; the final moisture content of the freeze dried coffee was 3.0% by weight.

The final freeze dried product was used to prepare a 25% by weight coffee soluble solution and the flavor of this solution was compared with the flavor of a portion of the extract from which the freeze dried particles were prepared. The expert flavor panel indicated that the solution prepared from the freeze dried particles had an excellent "brew-like" character and that there was no significant difference in the flavor character of the two liquids.

The length of the drying cycles shown in Examples I, II and III, above, demonstrating the rapid, high temperature freeze drying process of this invention are about 35% to about 50% or more shorter than in typical prior art freeze drying processes wherein the maximum temperature of the dried portion of the coffee extract never exceeds about 110° F.

What is claimed is:

1. A process for rapidly freeze drying a frozen aqueous coffee extract which comprises maintaining the frozen extract at a temperature of less than about —10° F. and at an absolute pressure of less than about 500 microns of mercury, transferring heat to the frozen extract at a rate sufficient to promote sublimation of the frozen water in the extract, and varying the rate of transferring heat whereby: (a) the maximum temperature of the dried portion of the extract exceeds about 140° F. during a one to 4½ hour portion of the freeze drying process; (b) the maximum temperature of the dried portion of the extract never exceeds about 180° F.; and (c) the length of time for which any part of the dried portion of the extract is held at and above any temperature below about 180° F. does not exceed the time shown in accompanying FIGURE 1, curve A.

2. The process of claim 1 wherein the length of time for which any part of the dried portion of the extract is held at and above any temperature below about 180° F.

does not exceed the time shown in accompanying FIGURE 1, curve B.

3. The process of claim 1 wherein the absolute pressure is less than about 200 microns of mercury.

4. The process of claim 1 wherein the frozen extract contains from about 20% to about 35% by weight coffee solubles.

5. The process of claim 1 wherein the frozen extract is granulated to from about 2½ mesh to about 12 mesh Tyler screen size.

6. The process of claim 1 wherein the extract is frozen in an atmosphere having a temperature of from about −5° F. to about −40° F.

References Cited

UNITED STATES PATENTS 2,509,681   5/1950   Flosdorf _____ 99—206

FOREIGN PATENTS 723,129   12/1965   Canada.

MAURICE W. GREENSTEIN, Primary Examiner

U.S. Cl. X.R.

34—5; 99—199